(12) United States Patent
Caldwell et al.

(10) Patent No.: US 7,668,086 B2
(45) Date of Patent: Feb. 23, 2010

(54) VERIFICATION AND CORRECTION OF 10GBASE-X LANE ROUTING BETWEEN NODES

(75) Inventors: Maurice Caldwell, Robbinsville, NJ (US); Howard Baumer, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 1545 days.

(21) Appl. No.: 10/667,385

(22) Filed: Sep. 23, 2003

(65) Prior Publication Data

US 2005/0063310 A1    Mar. 24, 2005

(51) Int. Cl.
*G01R 31/38* (2006.01)
(52) U.S. Cl. .................. 370/230; 370/242; 714/100
(58) Field of Classification Search .......... 370/230, 370/235, 236, 236.1, 236.2, 241.1, 242, 248, 370/449–451, 462; 714/1, 2, 703, 724, 735, 714/737
See application file for complete search history.

(56) References Cited

U.S. PATENT DOCUMENTS

| | | | |
|---|---|---|---|
| 6,961,347 B1* | 11/2005 | Bunton et al. ............... | 370/465 |
| 7,272,679 B2* | 9/2007 | Taborek et al. .............. | 710/305 |
| 7,305,047 B1* | 12/2007 | Turner ......................... | 375/316 |
| 7,376,146 B2* | 5/2008 | Beverly et al. .............. | 370/465 |
| 7,394,825 B2* | 7/2008 | Kim et al. .................... | 370/466 |
| 7,447,953 B2* | 11/2008 | Vogt ............................ | 714/716 |
| 2003/0099260 A1* | 5/2003 | Bunton ........................ | 370/535 |
| 2005/0063413 A1 | 3/2005 | Caldwell et al. | |
| 2005/0135421 A1* | 6/2005 | Chang et al. ................. | 370/474 |

OTHER PUBLICATIONS

Draft Supplement to IEEE Std. 802.3, 46. Reconciliation Sublayer (RS) and 10 Gigabit Media Independent Interface (XGMII), IEEE Draft PS02.3ae/D5.0, 2002, pp. 271-343.*
InfiniBand Architecture Release 1.0, "Chapter 5: Link/Phy Interface," vol. 2, Physical Specifications, Oct 2000, pp. 65-131.*

* cited by examiner

*Primary Examiner*—Donald L Mills
(74) *Attorney, Agent, or Firm*—Sterne, Kessler, Goldstein & Fox P.L.L.C.

(57) ABSTRACT

In a network having a first node and a second node, a method of verifying a lane routing between the first node and the second node. The first node and the second node operate according to a protocol in which: (1) a character is converted to code groups, (2) each code group has a corresponding lane, and (3) the code groups are communicated across the lanes in a parallel manner. A first set of code groups is transmitted from the first node. Preferably, the first set of code groups is different from a set of code groups predefined by the protocol. A second set of code groups is received at the second node. The second set of code groups corresponds to the first set of code groups. A determination is made whether the second set of code groups matches the first set of code groups. An identity of the first set of code groups can be preprogrammed within the second node. Preferably, the first set of code groups has a different code group in each lane. Optionally, the lane routing between the first node and the second node is corrected if the second set of code groups mismatches the first set of code groups.

35 Claims, 13 Drawing Sheets

| XGMII TXC | XGMII TXD | PCS code-group | Description |
|---|---|---|---|
| 0 | 00 through FF | Dxx.y | Normal data transmission |
| 1 | 07 | K28.0 or K28.3 or K28.5 | Idle in \|I\| |
| 1 | 07 | K28.5 | Idle in \|T\| |
| 1 | 9C | K28.4 | Sequence |
| 1 | FB | K27.7 | Start |
| 1 | FD | K29.7 | Terminate |
| 1 | FE | K30.7 | Error |
| 1 | Other value in Table 36-2 | See Table 36-2 | Reserved XGMII character |
| 1 | Any other value | K30.7 | Invalid XGMII character |

NOTE—Values in TXD column are in hexadecimal.

Table 36-2-Valid special code-groups

| Code Group Name | Octet Value | Octet Bits HGF EDCBA | Current RD - abcdei fghj | Current RD + abcdei fghj | Notes |
|---|---|---|---|---|---|
| K28.0 | 1C | 000 11100 | 001111 0100 | 110000 1011 | 1 |
| K28.1 | 3C | 001 11100 | 001111 1001 | 110000 0110 | 1,2 |
| K28.2 | 5C | 010 11100 | 001111 0101 | 110000 1010 | 1 |
| K28.3 | 7C | 011 11100 | 001111 0011 | 110000 1100 | 1 |
| K28.4 | 9C | 100 11100 | 001111 0010 | 110000 1101 | 1 |
| K28.5 | BC | 101 11100 | 001111 1010 | 110000 0101 | 2 |
| K28.6 | DC | 110 11100 | 001111 0110 | 110000 1001 | 1 |
| K28.7 | FC | 111 11100 | 001111 1000 | 110000 0111 | 1,2 |
| K23.7 | F7 | 111 10111 | 111010 1000 | 000101 0111 | |
| K27.7 | FB | 111 11011 | 110110 1000 | 001001 0111 | |
| K29.7 | FD | 111 11111 | 101110 1000 | 010001 0111 | |
| K30.7 | FE | 111 11110 | 011110 1000 | 100001 0111 | |

NOTE 1 — Reserved.
NOTE 2 — Contains a comma.

FIG. 5

| Code | Ordered_Set | Number of code-groups | Encoding |
|---|---|---|---|
| ‖I‖ | Idle | | Substitute for XGMII Idle |
| ‖K‖ | Sync column | 4 | /K28.5/K28.5/K28.5/K28.5/ |
| ‖R‖ | Skip column | 4 | /K28.0/K28.0/K28.0/K28.0/ |
| ‖A‖ | Align column | 4 | /K28.3/K28.3/K28.3/K28.3/ |
| | Encapsulation | | |
| ‖S‖ | Start column | 4 | /K27.7/Dx.y/Dx.y/Dx.y/[a] |
| ‖T‖ | Terminate column | 4 | Terminate code-group in any lane |
| ‖T$_0$‖ | Terminate in Lane 0 | 4 | /K29.7/K28.5/K28.5/K28.5/ |
| ‖T$_1$‖ | Terminate in Lane 1 | 4 | /Dx.y/K29.7/K28.5/K28.5/[a] |
| ‖T$_2$‖ | Terminate in Lane 2 | 4 | /Dx.y/Dx.y/K29.7/K28.5/[a] |
| ‖T$_3$‖ | Terminate in Lane 3 | 4 | /Dx.y/Dx.y/Dx.y/K29.7/[a] |
| | Control | | |
| /E/ | Error code-group | 1 | /K30.7/ |
| | Link Status | | |
| ‖Q‖ | Sequence ordered_set | 4 | /K28.4/Dx.y/Dx.y/Dx.y/[a] |
| ‖LF‖ | Local Fault signal | 4 | /K28.4/D0.0/D0.0/D1.0/ |
| ‖RF‖ | Remote Fault signal | 4 | /K28.4/ D0.0/D0.0/D2.0/ |
| ‖Qrsvd‖ | Reserved | 4 | ‖LF‖ and ‖RF‖ |
| | Reserved | | |
| ‖Fsig‖ | Signal ordered_set | 4 | /K28.2/Dx.y/Dx.y/Dx.y/[a,b] |

[a]/Dx.y/ indicates any data code-group.
[b]/Reserved for INCITS T11.

FIG. 6

| Received Special Ordered Set | Lane Correction Switch Configuration |
|---|---|
| /Da.b/Dc.d/De.f/Dg.h/ | /$S_{0.0}$/$S_{1.1}$/$S_{2.2}$$S_{3.3}$/ |
| /Da.b/Dc.d/Dg.h/De.f/ | /$S_{0.0}$/$S_{1.1}$/$S_{2.3}$/$S_{3.2}$/ |
| /Da.b/De.f/Dc.d/Dg.h/ | /$S_{0.0}$/$S_{1.2}$/$S_{2.1}$/$S_{3.3}$/ |
| /Da.b/De.f/Dg.h/Dc.d/ | /$S_{0.0}$/$S_{1.2}$/$S_{2.3}$/$S_{3.1}$/ |
| /Da.b/Dg.h/Dc.d/De.f/ | /$S_{0.0}$/$S_{1.3}$/$S_{2.1}$/$S_{3.2}$/ |
| /Da.b/Dg.h/De.f/Dc.d/ | /$S_{0.0}$/$S_{1.3}$/$S_{2.2}$/$S_{3.1}$/ |
| /Dc.d/Da.b/De.f/Dg.h/ | /$S_{0.1}$/$S_{1.0}$/$S_{2.2}$/$S_{3.3}$/ |
| /Dc.d/Da.b/Dg.h/De.f/ | /$S_{0.1}$/$S_{1.0}$/$S_{2.3}$/$S_{3.2}$/ |
| /Dc.d/De.f/Da.b/Dg.h/ | /$S_{0.1}$/$S_{1.2}$/$S_{2.0}$/$S_{3.3}$/ |
| /Dc.d/De.f/Dg.h/Da.b/ | /$S_{0.1}$/$S_{1.2}$/$S_{2.3}$/$S_{3.0}$/ |
| /Dc.d/Dg.h/Da.b/De.f/ | /$S_{0.1}$/$S_{1.3}$/$S_{2.0}$/$S_{3.2}$/ |
| /Dc.d/Dg.h/De.f/Da.b/ | /$S_{0.1}$/$S_{1.3}$/$S_{2.2}$/$S_{3.0}$/ |
| /De.f/Da.b/Dc.d/Dg.h/ | /$S_{0.2}$/$S_{1.0}$/$S_{2.1}$/$S_{3.3}$/ |
| /De.f/Da.b/Dg.h/Dc.d/ | /$S_{0.2}$/$S_{1.0}$/$S_{2.3}$/$S_{3.1}$/ |
| /De.f/Dc.d/Da.b/Dg.h/ | /$S_{0.2}$/$S_{1.1}$/$S_{2.0}$/$S_{3.3}$/ |
| /De.f/Dc.d/Dg.h/Da.b/ | /$S_{0.2}$/$S_{1.1}$/$S_{2.3}$/$S_{3.0}$/ |
| /De.f/Dg.h/Da.b/Dc.d/ | /$S_{0.2}$/$S_{1.3}$/$S_{2.0}$/$S_{3.1}$/ |
| /De.f/Dg.h/Dc.d/Da.b/ | /$S_{0.2}$/$S_{1.3}$/$S_{2.1}$/$S_{3.0}$/ |
| /Dg.h/Da.b/Dc.d/De.f/ | /$S_{0.3}$/$S_{1.0}$/$S_{2.1}$/$S_{3.2}$/ |
| /Dg.h/Da.b/De.f/Dc.d/ | /$S_{0.3}$/$S_{1.0}$/$S_{2.2}$/$S_{3.1}$/ |
| /Dg.h/Dc.d/Da.b/De.f/ | /$S_{0.3}$/$S_{1.1}$/$S_{2.0}$/$S_{3.2}$/ |
| /Dg.h/Dc.d/De.f/Da.b/ | /$S_{0.3}$/$S_{1.1}$/$S_{2.2}$/$S_{3.0}$/ |
| /Dg.h/De.f/Da.b/Dc.d/ | /$S_{0.3}$/$S_{1.2}$/$S_{2.0}$/$S_{3.1}$/ |
| /Dg.h/De.f/Dc.d/Da.b/ | /$S_{0.3}$/$S_{1.2}$/$S_{2.1}$/$S_{3.0}$/ |

VERIFICATION AND CORRECTION OF 10GBASE-X LANE ROUTING BETWEEN NODES

CROSS-REFERENCE TO RELATED APPLICATIONS

This patent application is related to the following commonly owned, co-pending U.S. utility patent application:

U.S. application Ser. No. 10/667,604, which is filed concurrently herewith and incorporated herein by reference.

BACKGROUND OF THE INVENTION

1. Field of the Invention

The present invention relates in general to local area networks, and specifically to verification and correction of a 10GBASE-X lane routing between nodes.

2. Background Art

Ethernet protocol is a popular technology used to implement Local Area Networks (LANs), and was originally developed in the late 1970s. In 1985, Ethernet was adopted by the Standards Board of the Institute of Electrical and Electronics Engineers Standards Association (IEEE-SA) as IEEE Std 802.3® The IEEE-SA has approved an amendment for "Media Access Control (MAC) Parameters, Physical Layers, and Management Parameters for 10 Gb/s Operation" to IEEE Std 802.3. The amended standard is designated IEEE Std 802.3ae™. The technology it supports is commonly referred to as "10 Gigabit Ethernet". IEEE Std 802.3ae introduces Clause 48 entitled "Physical Coding Sublayer (PCS) and Physical Medium Attachment (PMA) Sublayer, Type 10GBASE-X." 10GBASE-X refers to a family of 10 Gb/s Physical Layer implementations.

To facilitate the use of high speed serial busses, 10GBASE-X expands upon the configuration set forth in Clause 36 of IEEE Std 802.3 entitled "Physical Coding Sublayer (PCS) and Physical Medium Attachment (PMA) Sublayer, Type 1000BASE-X." 1000BASE-X refers to a family of 1000 Mb/s Physical Layer implementations. When transmitting from the Reconciliation Sublayer (RS), 1000BASE-X uses an 8B/10B Encoder in the PCS to map eight-bit Gigabit Media Independent Interface (GMII) characters to ten-bit code groups. Likewise, 10GBASE-X maps 10 Gigabit Media Independent Interface (XGMII) (or comparably formatted) characters to code groups. However, while GMII characters are eight bits in length, XGMII characters include 32 data bits, four control bits, and a clock. Therefore, whereas 1000BASE-X encodes GMII within a single lane configured to transmit at a rate of up to 125 million code groups per second, 10GBASE-X encodes XGMII to four lanes, each configured to transmit at a rate of up to 312.5 million code groups per second. 10GBASE-X designates its lanes as follows: lane 0, lane 1, lane 2, and lane 3.

Because a lane is coupled between an input port and an output port, the use of multiple lanes entails the use of multiple input ports and multiple output ports. This invites the possibility that lanes will be misrouted between ports. The possibility of lanes being misrouted diminishes the reliability of the IEEE Std 802.3ae protocol. What is needed is a method for verifying a 10GBASE-X lane routing between nodes.

Preferably, such a method would also be capable of correcting the effects of misrouted lanes on communications between nodes.

BRIEF SUMMARY OF THE INVENTION

The present invention relates to verification and correction of a 10GBASE-X 218 lane routing between nodes. In an embodiment, the present invention comprises a method, in a local area network having at least a first node with an IEEE Std 802.3ae™ 10GBASE-X Physical Layer and a second node with the IEEE Std 802.3ae 10GBASE-X Physical Layer, for verifying a 10GBASE-X lane routing between the first node and the second node. A first ordered set is transmitted from the first node. The first ordered set complies with IEEE Std 802.3ae specifications for ordered sets. The first ordered set is different from ordered sets predefined by the IEEE Std 802.3ae specifications. A second ordered set is received at the second node. A determination is made whether the second ordered set is identical to the first ordered set.

Permutations of code groups within the first ordered set yield different ordered sets. Preferably, each of the different ordered sets is different from the ordered sets predefined by the IEEE Std 802.3ae specifications. Preferably, the first ordered set has a different code group in each lane. The first ordered set can be preprogrammed within a Physical Coding Sublayer (PCS), capable of being programmed by a user, or both. The first ordered set can be generated. For example, the first ordered set can be generated when the first node is activated, upon recognizing or detecting a link status condition indicative of misrouted IEEE Std 802.3ae 10GBASE-X lanes, or both. In an embodiment, the first ordered set can be: (1) stored in a first memory at a PCS of the first node, (2) identified, (3) transmitted after an A-ordered set, or (4) any combination of the foregoing.

In an embodiment, the second ordered set can be: (1) stored in a second memory of the second node, (2) identified at the second node, or (3) any combination of the foregoing. The effects of misrouted IEEE Std 802.3ae 10GBASE-X lanes can be corrected in response to the identified second ordered set. The effects of misrouted IEEE Std 802.3ae 10GBASE-X lanes can be corrected by opening a first switch coupled between a first input port and a first output port and closing a second switch coupled between the first input port and a second output port. The effects of misrouted IEEE Std 802.3ae 10GBASE-X lanes can be further corrected by opening a third switch coupled between the second input port and the second output port and closing a fourth switch coupled between the second input port and the first output port.

In another embodiment, the present invention comprises a network device for implementing an IEEE Std 802.3ae PCS. The network device includes a PCS service interface, a Physical Medium Attachment (PMA) service interface, Encoders, Decoders, a first logic circuit, a second logic circuit, a third logic circuit, a first memory, and a second memory. The Encoders are coupled to the PCS service interface and are configured to encode a 10 Gigabit Media Independent Interface (XGMII) character into code groups. The PMA service interface is coupled to the Encoders. The Decoders are coupled between the PCS service interface and the PMA service interface and are configured to decode the code groups into an XGMII character.

The first logic circuit is coupled between the PCS service interface and the PMA service interface and is configured to identify a first ordered set received from a Reconciliation Sublayer (RS). The first ordered set complies with IEEE Std 802.3ae specifications for ordered sets. The first ordered set is different from ordered sets predefined by the IEEE Std 802.3ae specifications. Preferably, the first ordered set has a different code group in each lane. The first memory is coupled to the first logic circuit and is configured to store the first ordered set. The second logic circuit is coupled to the first logic circuit and is configured to ensure that the first ordered set is transmitted in place of a K-ordered set or an R-ordered set during a clock cycle following a transmission of an A-ordered set. The second memory is coupled between the PCS service interface and the PMA service interface and is configured to store a second ordered set received from a PMA sublayer. The second ordered set can be identical to the first ordered set. The third logic circuit is coupled to the second logic circuit and is configured to identify the second ordered set received from the PMA sublayer. At least one of the first logic circuit and the third logic circuit can be further configured to identify an ordered set from the ordered sets predefined by the IEEE Std 802.3ae specifications.

Permutations of code groups within the first ordered set yield different ordered sets. Preferably, each of the different ordered sets is different from the ordered sets predefined by the IEEE Std 802.3ae specifications. The first ordered set can be preprogrammed within the first logic circuit, capable of being programmed by a user, or both. The second ordered set can be preprogrammed within the third logic circuit.

In an embodiment, the network device further comprises a fourth logic circuit. The fourth logic circuit is coupled to the third logic circuit and is configured to correct effects of misrouted IEEE Std 802.3ae 10GBASE-X lanes. The effects of the misrouted IEEE Std 802.3ae 10GBASE-X lanes can be corrected in response to the second ordered set stored in the second memory. The fourth logic circuit can comprise a set of switches such that each switch is configured to route an IEEE Std 802.3ae 10GBASE-X lane from an input port to an output port. The set of switches can include sixteen switches.

In yet another embodiment, the present invention comprises a method of verifying a lane routing between a first node in a network and a second node in the network. The first node and the second node operate according to a protocol in which: (1) a character is converted to code groups, (2) each code group has a corresponding lane, and (3) the code groups are communicated across the lanes in a parallel manner. A first set of code groups is transmitted from the first node. Preferably, the first set of code groups is different from a set of code groups predefined by the protocol. A second set of code groups is received at the second node. The second set of code groups corresponds to the first set of code groups. A determination is made whether the second set of code groups matches the first set of code groups. An identity of the first set of code groups can be preprogrammed within the second node. Preferably, the first set of code groups has a different code group in each lane. Optionally, the lane routing between the first node and the second node is corrected if the second set of code groups mismatches the first set of code groups.

In still another embodiment, the present invention comprises a method, in a local area network having at least a first node with an IEEE Std 802.3ae™ 10GBASE-X Physical Layer and a second node with the IEEE Std 802.3ae 10GBASE-X Physical Layer, for verifying a 10GBASE-X lane routing between the first node and the second node. A Q-ordered set is transmitted from the first node. The Q-ordered set is one of /K28.4/D0.0/D0.0/D1.0/ and /K28.4/D0.0/D0.0/D2.0/. A second ordered set is received at the second node. The second ordered set is one of /K28.4/D0.0/D0.0/D1.0/, /D1.0/K28.4/D0.0/D0.0/, /D0.0/D1.0/K28.4/D0.0/, /D0.0/D0.0/ D1.0/K28.4/, /D1.0/D0.0/D0.0/K28.4/, /K28.4/ D1.0/D0.0/D0.0/, /D0.0/K28.4/D1.0/D0.0/, /D0.0/D0.0/ K28.4/D1.0/, /K28.4/D0.0/D0.0/D2.0/, /D2.0/K28.4/D0.0/ D0.0/, /D0.0/D2.0/K28.4/D0.0/, /D0.0/D0.0/D2.0/K28.4/, / D2.0/D0.0/D0.0/K28.4/, /K28.4/D2.0/D0.0/D0.0/, /D0.0/ K28.4/D2.0/D0.0/, and /D0.0/D0.0/K28.4/D2.0/. A determination is made whether the second ordered set is identical to the Q-ordered set.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

FIG. 5 presents tables of IEEE Std 802.3ae™ valid code groups.

FIG. 6 presents a table of predefined IEEE Std 802.3ae ordered sets and special code groups.

FIG. 9 presents a table of Lane Correction Switch Configuration as a function of the Received Special Ordered Set.

The preferred embodiments of the invention are described with reference to the figures where like reference numbers indicate identical or functionally similar elements. Also in the figures, the left most digit of each reference number identifies the figure in which the reference number is first used.

DETAILED DESCRIPTION OF THE INVENTION

Ethernet protocol is a popular technology used to implement Local Area Networks (LANs), and was originally developed in the late 1970s. In 1985, Ethernet was adopted by the Standards Board of the Institute of Electrical and Electronics Engineers Standards Association (IEEE-SA) as IEEE Std 802.3® entitled "Carrier Sense Multiple Access with Collision Detection (CSMA/CD) Access Method and Physical Layer Specifications". Since its initial release, IEEE Std 802.3 has been amended on several occasions to capture the benefits of advances in networking technologies and to drive the development of future advancements.

Figure 1:
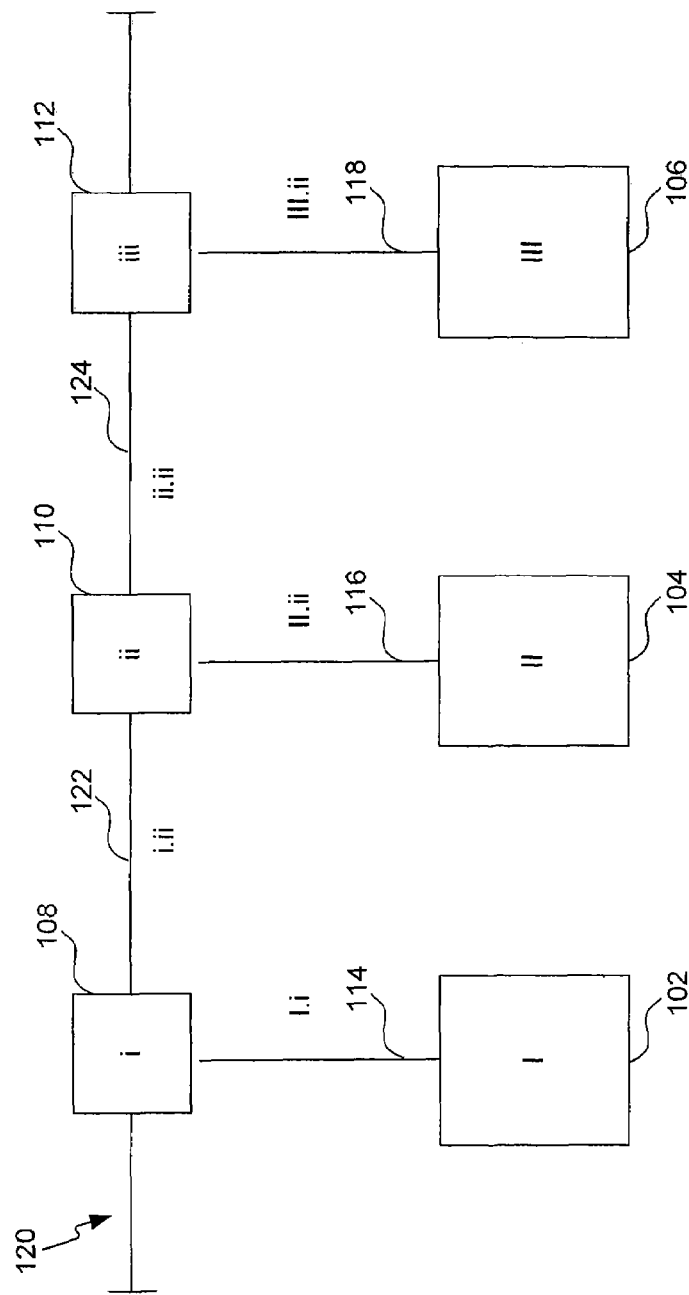
FIG. 1 illustrates an exemplary LAN 100.

FIG. 1 illustrates an exemplary LAN 100. LAN 100 includes, for example, nodes I 102, II 104, and III 106. The nodes can be personal computers, workstations, file servers, personal digital assistants, printers, modems, peripherals, terminals, and the like. Each node has a corresponding transceiver: i 108, ii 110, and iii 112. Typically, each node is coupled to its corresponding transceiver by a transceiver cable: I.i 114, II.ii 116, and III.iii 118. Each transceiver couples its corresponding node to a physical medium 120. Physical medium 120 can be realized in a variety of forms such as, but not limited to, twisted pair cable, patch cable, coaxial cable, and optical fiber. Transceivers i 108, ii 110, and iii 112 divide physical medium 120 into link segments: i.ii 122 and ii.iii 124. Nodes whose transceivers are directly connected together by a link segment without an interceding transceiver are referred to as link partners. For example, nodes I 102 and II 104 are link partners, and nodes II 104 and III 106 are link partners, but nodes I 102 and II 106 are not link partners. LAN 100 can be configured to include more or fewer nodes, more or fewer link segments between nodes, a hierarchical arrangement of nodes, or any combination of the foregoing.

The Ethernet protocol provides a process whereby, for example, data for an application at node I 102 can be formatted as a bit stream, communicated across physical medium 120 through transceivers i 108, ii 110, and iii 112, and reformatted at node III 106. Such a bit stream, with accompanying control bits, is referred to as a packet. The packet is transmitted by node I 102 and received by transceiver i 108, transmitted by transceiver i 108 and received by transceiver ii 110, transmitted by transceiver ii 110 and received by transceiver iii 112, and transmitted by transceiver iii 112 and received by node III 106. When a transceiver is in the process of transmitting or receiving a packet, the transceiver is said to be in data mode; otherwise, the transceiver is said to be in idle mode.

The Ethernet protocol also provides a process whereby a node can communicate with its link partner(s) to manage their shared portions of LAN 100. Typically, this is accomplished by messages communicated between nodes when their transceivers are in idle mode. For example, a node experiencing a fault can communicate this condition to its link partner(s) (i.e., local fault). A node can also detect a fault condition in a link partner (i.e., remote fault). Additionally, messages can be used to report the specific message handling capabilities of a link partner, the status of synchronization between link partners, and the like. Manufacturers of network devices can implement the requirements of the Ethernet processes in any manner they choose. They are also free to include other processes so long as these do not conflict with the standard. Network devices that meet these criteria are said to be compliant with the standard.

Figure 2:
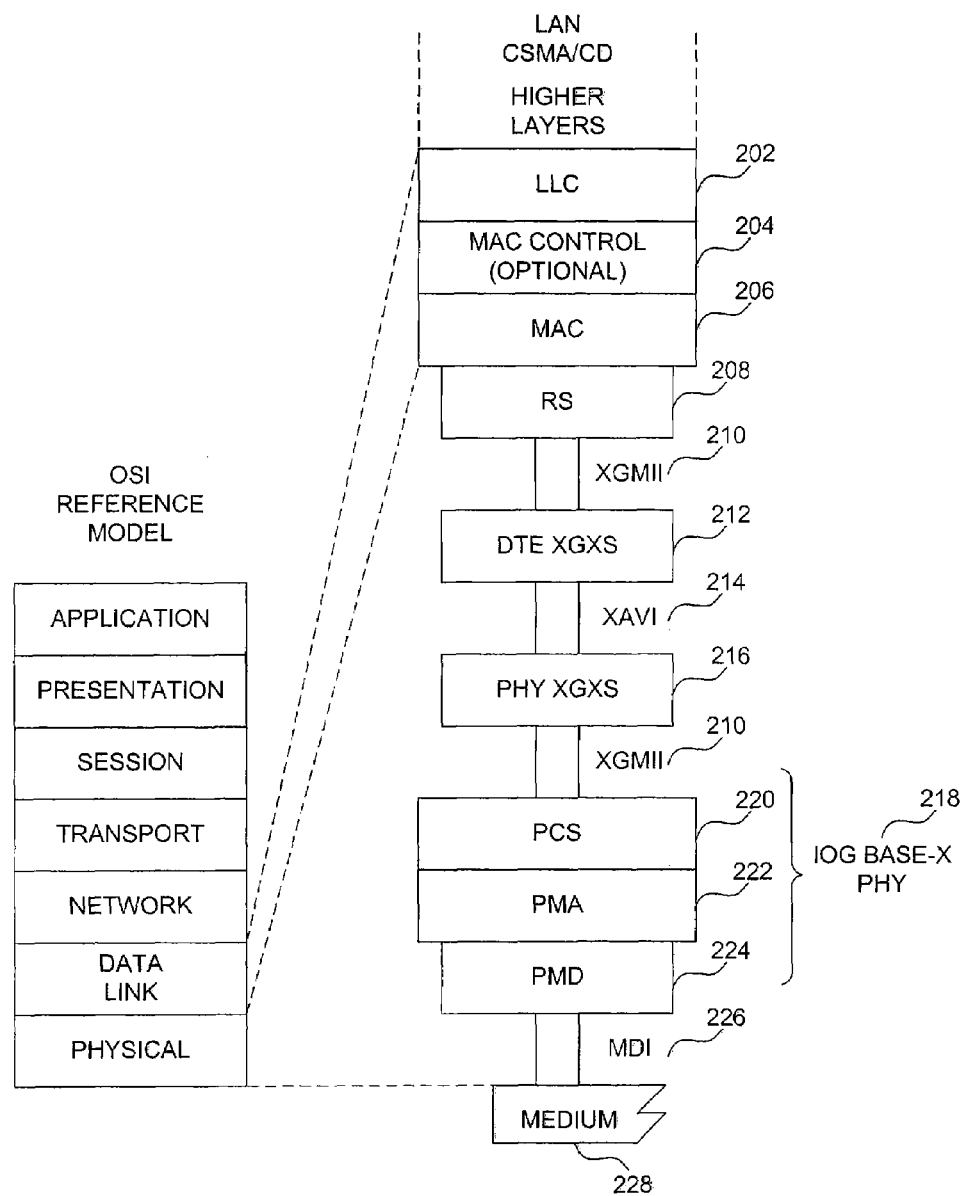
FIG. 2 shows the relationships among the 10GBASE-X sublayers 218 and other layers in the CSMA/CD LAN hierarchy 200.

The IEEE-SA has approved an amendment for "Media Access Control (MAC) Parameters, Physical Layers, and Management Parameters for 10 Gb/s Operation" to IEEE Std 802.3. The amended standard is designated IEEE Std 802.3ae™. The technology it supports is commonly referred to as "10 Gigabit Ethernet". IEEE Std 802.3ae introduces Clause 48 entitled "Physical Coding Sublayer (PCS) and Physical Medium Attachment (PMA) Sublayer, Type 10GBASE-X." IEEE Std 802.3ae, including Clause 48, is incorporated herein in its entirety by reference. 10GBASE-X refers to a family of 10 Gb/s Physical Layer implementations. FIG. 2 shows the relationships among the 10GBASE-X sublayers 218 and other layers in the CSMA/CD LAN hierarchy 200. The portions of the CSMA/CD LAN 200 hierarchy shown in FIG. 2 include Logical Link Control (LLC) 202, Media Access Control (MAC) Control 204, MAC 206, Reconciliation Sublayer (RS) 208, 10 Gigabit Media Independent Interface (XGMII) 210, Data Terminal Equipment XGMII Extender Sublayer (DTE XGXS) 212, 10 Gigabit Attachment Unit Interface (XAUI) 214, Physical XGMII Extender Sublayer (PHY XGXS) 216, 10 GBASE-X Physical Layer 218, Medium Dependent Interface 226, and Medium 228. 10GBASE-X Physical Layer 218 includes PCS 220, PMA sublayer 222, and Physical Medium Dependent (PMD) sublayer 224.

Figure 3:
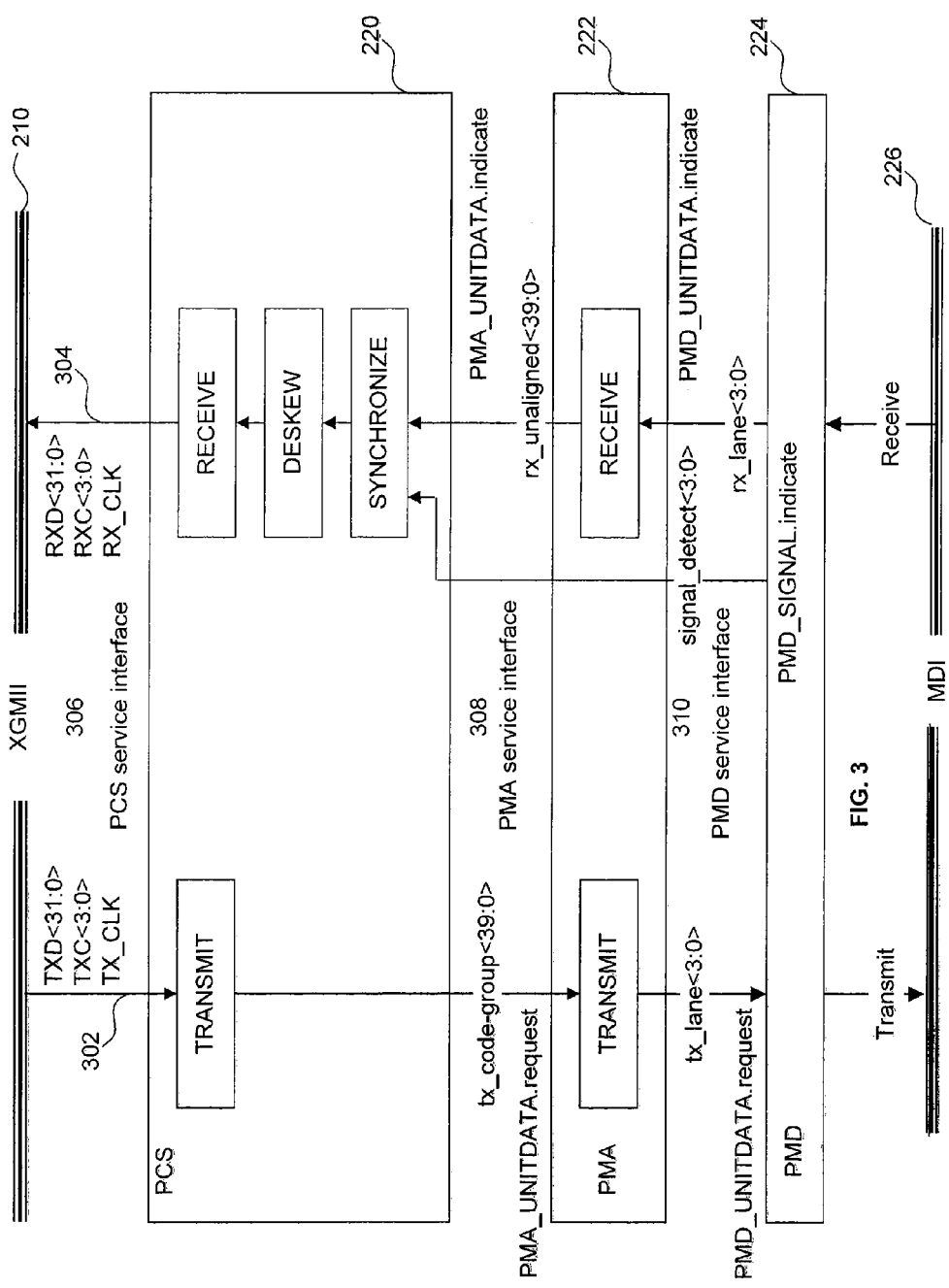
FIG. 3 shows the functions performed by the 10GBASE-X sublayers 218.

FIG. 3 shows the functions performed by the 10GBASE-X sublayers 218. The 10GBASE-X sublayers 218 include a transmit bus 302 and a receive bus 304. Communications along transmit bus 302 or receive bus 304 are said to be "in band". Communications along other busses (not shown) of the 10GBASE-X sublayers 218 are not "in band". The MDI 226 is used to communicate between the PMD sublayer 224 and the medium 228. In an embodiment, XGMII 210 is used to communicate between the RS 208 and the PCS 220 at a PCS service interface 306. A PMA service interface 308 is positioned between the PMA sublayer 222 and the PCS 220. A PMD service interface 310 is positioned between the PMD sublayer 224 and the PMA sublayer 222.

As shown in FIG. 2, optionally, XGXSs 212 and 216 can be used to extend the operational distance of the XGMII 210. The DTE XGXS 212 can be coupled to the RS 208 and the PHY XGXS 216 can be coupled to the 10GBASE-X Physical layer 218. The XAUI 214 can be used to communicate between the DTE XGXS 212 and the PHY XGXS 216. The XGXSs 212 and 216 and the XAUI 214 are described in Clause 47 of IEEE Std 802.3ae. Clause 47 is entitled "XGMII Extender Sublayer (XGXS) and 10 Gigabit Attachment Unit Interface (XAUI)" and is incorporated herein with IEEE Std 802.3ae in its entirety by reference.

To facilitate the use of high speed serial busses, 10GBASE-X 218 expands upon the configuration set forth in Clause 36 of IEEE Std 802.3 entitled "Physical Coding Sublayer (PCS) and Physical Medium Attachment (PMA) Sublayer, Type 1000BASE-X." IEEE Std 802.3, including Clause 36, is incorporated herein in its entirety by reference. 1000BASE-X refers to a family of 1000 Mb/s Physical Layer implementations. When transmitting from the RS 208, 1000BASE-X uses an 8B/10B Encoder in the PCS 220 to map eight-bit GMII characters to ten-bit code groups. The sequence of zeros and ones in each ten-bit code group is arranged so that it includes three to eight transitions from one state to the other. This large number of transitions prevents drift of the Phase Locked Loop (PLL) clock at the receiver and thus ensures that the PLL clock maintains synchronization with the data stream.

Figure 4:
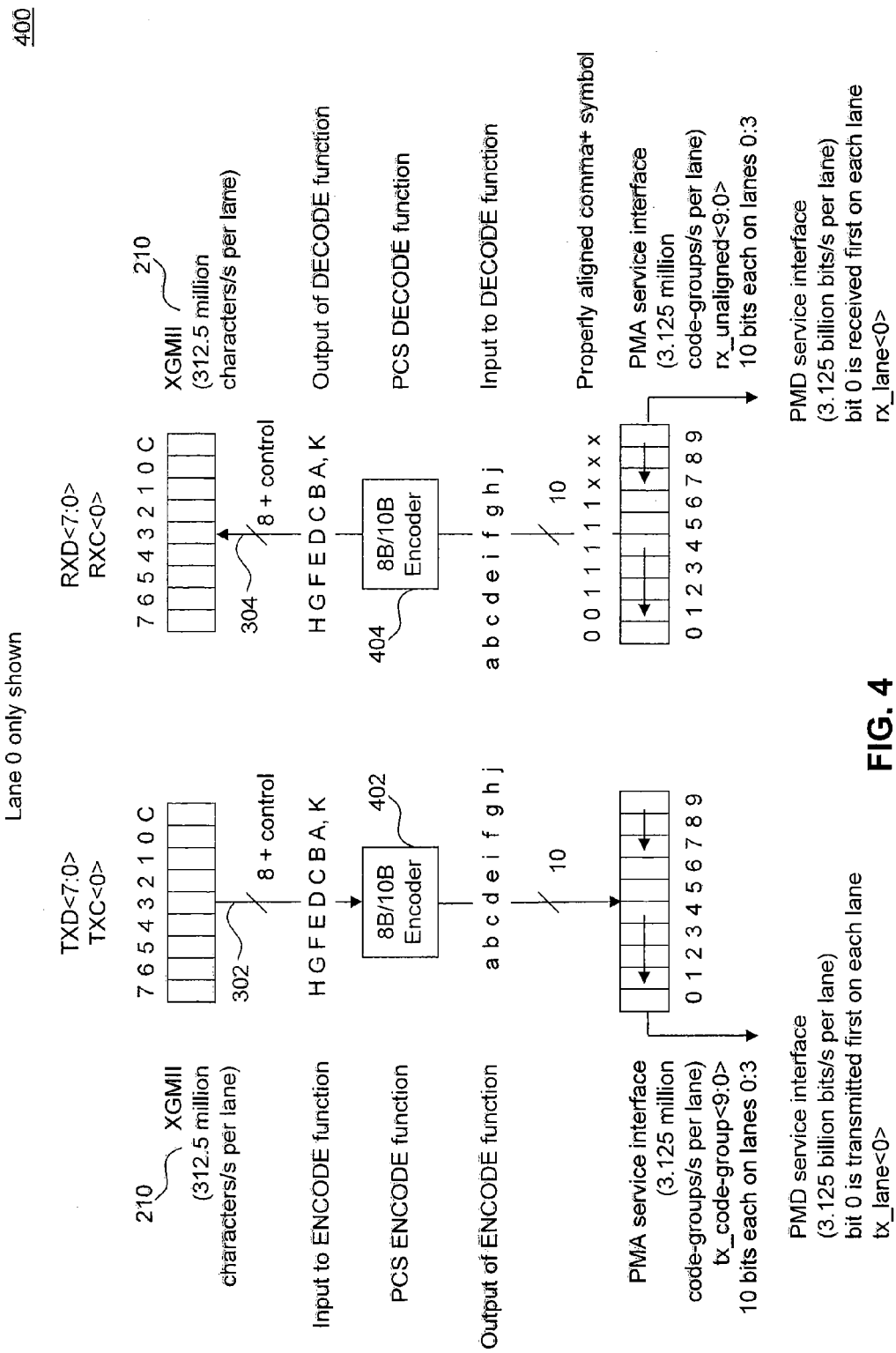
FIG. 4 illustrates the processes of mapping between XGMII characters and code groups for a single lane 400.

Likewise, 10GBASE-X 218 maps XGMII 210 (or comparably formatted) characters to code groups. However, while GMII characters are eight bits in length, XGMII 210 characters include 32 data bits, four control bits, and a clock. Therefore, whereas 1000BASE-X encodes GMII within a single lane configured to transmit at a rate of up to 125 million code groups per second, 10GBASE-X 218 encodes XGMII 210 to four lanes, each configured to transmit at a rate of up to 312.5 million code groups per second. In other words, 10GBASE-X 218 encodes 36 bits (32 data bits and four control bits) into four nine-bit lanes (eight data bits and one control bit). 10GBASE-X 218 designates its lanes as follows: lane 0, lane 1, lane 2, and lane 3. Each lane includes eight data bits and a control bit. Each lane of an XGMII character is represented as a three digit number in which the most significant digit corresponds to the control bit and the remaining two digits are a hexadecimal expression of the eight data bits. FIG. 4 illustrates the processes of mapping between XGMII characters and code groups for a single lane 400. Lane 400 includes an Encoder 402 in the PCS 220 to map the eight data bits and the control bit to a ten-bit code group. The four code groups are simultaneously transmitted in parallel across the four lanes. The converse operation is performed with a Decoder 404 when receiving a signal from the PMA sublayer 224. The ten bits in the code groups can be communicated serially in a specified order between the PMD sublayer 224 and the MDI 226. The present invention is not limited to four lanes, but could use any number of lanes.

In IEEE Std 802.3ae, code groups are differentiated as either data code groups or special code groups. In each lane, if the control bit from the XGMII character is a zero, then the resulting code group is a data code group. 10GBASE-X 218 allows for 256 different data code groups. In each lane, if the control bit from the XGMII character is a one, then the resulting code group is a special code group. Clause 48 defines valid special code groups. FIG. 5 presents tables of IEEE Std 802.3ae valid code groups. Data code groups are annotated "Dx.y", where "x" is the decimal value of XGMII bits EDCBA (see FIG. 4), and "y" is the decimal value of XGMII bits HGF (see FIG. 4). Special code groups are similarly annotated "Kx.y". Code groups with bit combinations not specified in FIG. 5 are invalid.

IEEE Std 802.3ae also uses ordered sets of code groups. Each ordered set: (1) consists of combinations of special and data code groups, (2) is four code groups in length, and (3) begins in lane 0. Special code groups and ordered sets provide capabilities for error indication, packet delineation, column fill, synchronization, deskew, clock rate compensation, and link status reporting. An ordered set can be annotated as a sequential listing of its code groups with slash symbols ("/") used to differentiate lanes. For example, the sequence /Ka.b/Dc.d/De.f/Dg.h/ indicates that code group Ka.b is assigned to lane 0, code group Dc.d is assigned to lane 1, etc. An ordered set can also be annotated by a letter with a double bar symbol ("||") before and after the designator (e.g., ||Z||). FIG. 6 presents a table of predefined IEEE Std 802.3ae ordered sets and special code groups. In this table, use of data code group "Dx.y" at a position in a sequence indicates that any data code group can be used in that lane. The ordered sets of FIG. 6 are organized in groups, which are named for the functions they support: Idle, Encapsulation, and Link Status.

Idle ordered sets are transmitted by a transceiver each clock cycle when the transceiver is in idle mode. Idle ordered sets are generated and interpreted by the PCS. Because 10GBASE-X 218 uses four lanes to transmit XGMII characters, IEEE Std 802.3ae uses Idle ordered sets: (1) to verify that code group reception of each lane is synchronized, (2) to check alignment of each lane relative to the others, and (3) to provide for clock rate compensation (10GBASE-X supports multiple clock domains along a link segment). Thus, IEEE Std 802.3ae defines three specific Idle ordered sets: ||K||, ||A||, and ||R|| (see FIG. 6). Respectively, these are also referred to as a K-ordered set, an A-ordered set, and an R-ordered set. A K-ordered set, /K28.5/K28.5/K28.5/K28.5/ (see FIG. 6), verifies that code group reception of each lane is synchronized. An R-ordered set, /K28.0/K28.0/K28.0/K28.0/ (see FIG. 6), provides for clock rate compensation. An A-ordered set, /K28.3/K28.3/K28.3/K28.3/ (see FIG. 6), checks alignment of each lane relative to the others. The standard also provides a strict protocol for determining when each of these Idle ordered sets is transmitted. Generally summarized, a random integer "r" is periodically generated. By the standard, r can range from 16 to 31. If r is odd, then an R-ordered set is transmitted each clock cycle, except that an A-ordered set is transmitted every $r^{th}$ cycle. If r is even, then a K-ordered set is transmitted each clock cycle, except that an A-ordered set is transmitted every $r^{th}$ cycle.

IEEE Std 802.3ae provides for link status reporting. Link status reporting is performed to identify and convey link status conditions to the RS 208 so that it can take actions to activate or deactivate a link. As described in IEEE Std 802.3 and IEEE Std 802.3ae, link status conditions can be detected or recognized. Link status reporting includes detection of link status conditions and signaling of link fault status. Link status conditions include signal status conditions, local fault signals, and remote fault signals. A fault condition may also be recognized when an error condition is detected. Because 10GBASE-X 218 uses four lanes to transmit XGMII characters, IEEE Std 802.3ae link status conditions also include deskew status conditions. Generally, link status conditions are received by the RS 208 in order to be recognized or detected. However, the PCS 220 can recognize some link status conditions. For example, a receive fault is recognized by the PCS 220 when code groups among the different lanes are skewed or misaligned.

IEEE Std 802.3ae uses Sequence ordered sets to communicate certain link status conditions. A Sequence ordered set is distinguished by having special code group K28.4 in lane 0 followed by three data code groups in lanes 1, 2, and 3: /K28.4/Dx.y/Dx.y/Dx.y/ (see FIG. 6). Special code group K28.4 is used to alert the PCS 220 that a Sequence ordered set is being transmitted. A Sequence ordered set is annotated as ||Q|| and thus is also referred to as a Q-ordered set. IEEE Std 802.3ae defines two specific Q-ordered sets: ||LF|| (/K28.4/D0.0/D0.0/D1.0/) for a local fault signal and ||RF|| (/K28.4/D0.0/D0.0/D2.0/) for a remote fault signal (see FIG. 6). Respectively, these are also referred to as an LF-ordered set and an RF-ordered set. The standard provides that, when a local or remote fault is recognized or detected by the PCS 220 or RS 208, the appropriate Q-ordered set (e.g., ||LF|| or ||RF||) is to be generated.

If generated by the RS 208, the Q-ordered set is transmitted to the PCS 220, where the Q-ordered set is received. A Q-ordered set received or generated by the PCS 220 is transmitted in place of the K-ordered set or the R-ordered set during the clock cycle immediately following the transmission of the A-ordered set. The Q-ordered set can be stored until the next A-ordered set is transmitted. Thus, in order for a network device that implements the PCS 220 to be compliant with IEEE Std 802.3ae, the network device includes: (1) a first logic circuit to identify a Q-ordered set when it is received from the RS 208, (2) a memory to store the Q-ordered set, and (3) a second logic circuit to ensure that, in place of the K-ordered set or the R-ordered set, the Q-ordered set is transmitted during the clock cycle immediately following the transmission of the A-ordered set. The network device also includes a third logic circuit to identify a Q-ordered set when it is received from the PMA sublayer 222. A Q-ordered set received from the PMA sublayer 222 is transmitted by the PCS 220 to the RS 208. The first logic circuit can be referred to as a first Q-ordered filter; the third logic circuit can be referred to as a second Q-ordered filter.

Figure 7A:
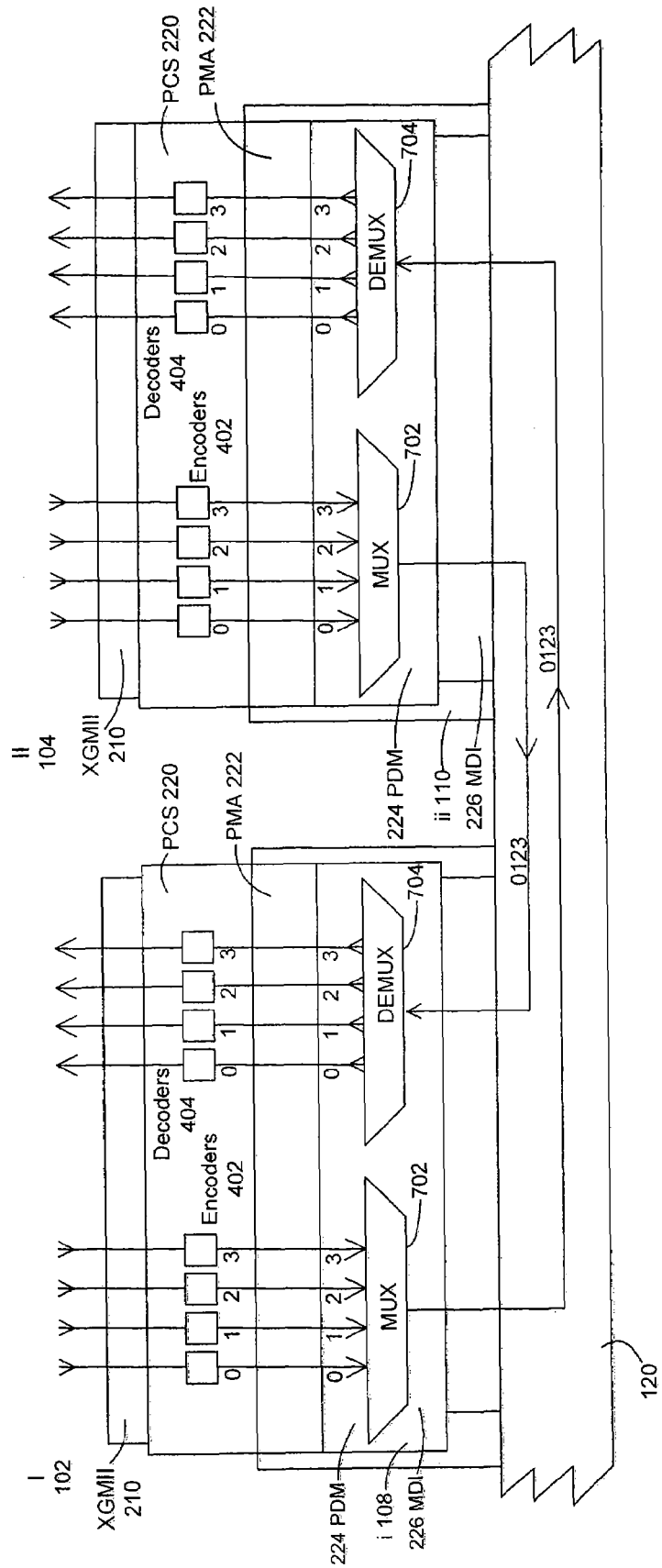
FIG. 7A illustrates the process of communicating from node I 102 to node II 104 in which the nodes have 10GBASE-X sublayers 218.

FIG. 7A illustrates the process of communicating from node I 102 to node II 104 in which the nodes have 10GBASE-X sublayers 218. (The process of communicating from node II 104 to node I 102 is identical.) At node I 102, the message is formatted as XGMII characters. The PCS 220 at node I 102 maps the XGMII characters to four lanes. The encoder 402 in each lane converts eight data bits and a control bit of each XGMII character to a ten-bit code group. A multiplexer 702 at node I 102 formats the four lanes as a bit stream in which the lanes are transmitted in sequence—lane 0, lane 1, lane 2, and lane 3—with the bits in each lane transmitted in the following order: abcdeifghj (see FIG. 4). The bit stream is communicated from node I 102 across physical medium 120 to node II 104. A demultiplexer 704 at node II 104 reformats the bit stream into four lanes. The decoder 404 in each lane converts the ten-bit code group to eight data bits and the control bit of the XGMII character. The PCS 220 at node II 104 maps the four lanes to the XGMII character.

Figure 7B:
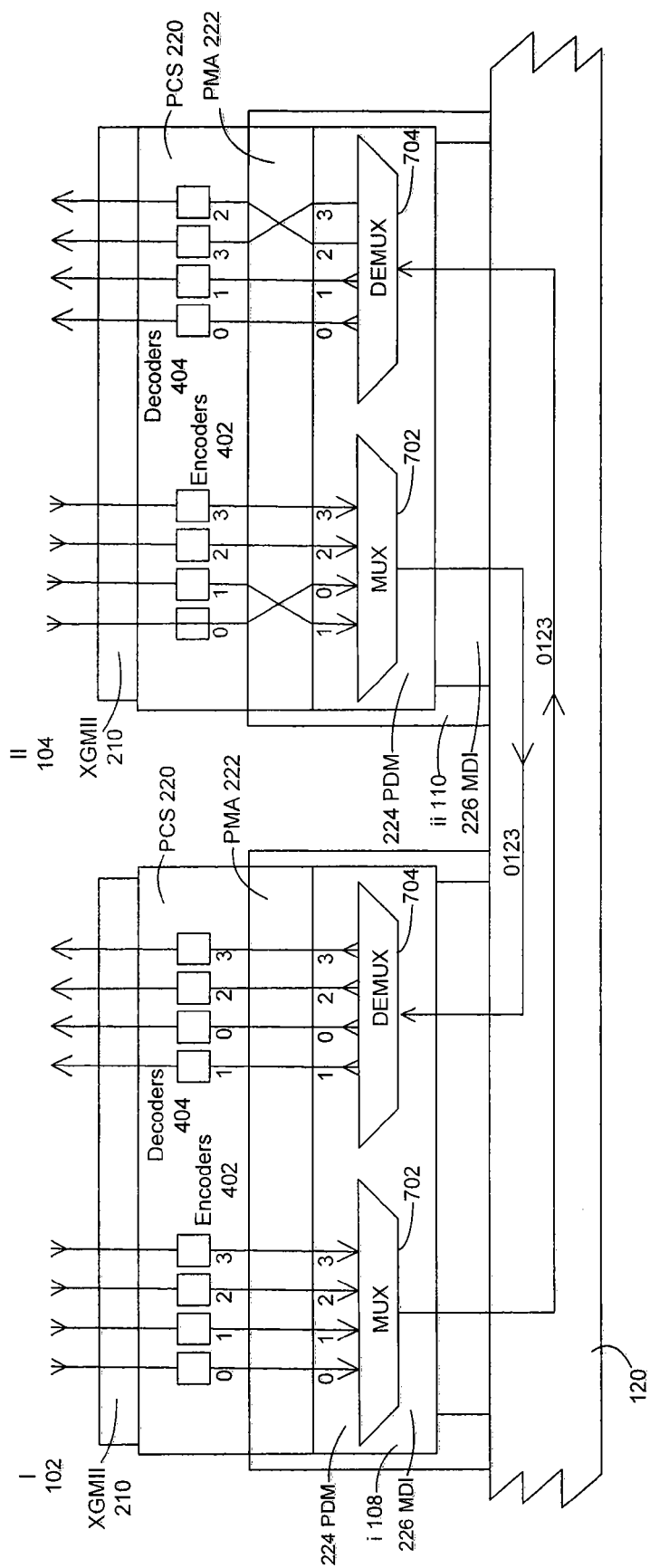
FIG. 7B illustrates the process of communicating from node I 102 to node II 104 in which the nodes have 10GBASE-X sublayers 218 with misrouted lanes.

Because a lane is coupled between an input port and an output port, the use of multiple lanes entails the use of multiple input ports and multiple output ports. This invites the possibility that lanes will be misrouted between ports. FIG. 7B illustrates the process of communicating from node I 102 to node II 104 in which the nodes have 10GBASE-X sublayers 218 with misrouted lanes. Again, at node I 102, the message is formatted as a bit stream in which the lanes are transmitted in sequence—lane 0, lane 1, lane 2, and lane 3—with the bits in each lane transmitted in the following order: abcdeifghj (see FIG. 4). The bit stream is communicated from node 1102 across physical medium 120 to node II 104. A demultiplexer 704 at node II 104 reformats the bit stream into four lanes. However, in FIG. 7B, between the ports of the demultiplexer 704 and the ports of the decoders 404, lanes 2 and 3 are misrouted. The decoder 404 in each lane converts the ten-bit code group to eight data bits and the control bit of the XGMII character and the PCS 220 at node II 104 maps the four lanes to the XGMII character, but the resulting XGMII character is in an improper sequence: lane 0, lane 1, lane 3, and lane 2.

Misrouting can also occur in the node performing the transmission. FIG. 7B also illustrates the process of communicating from node II 104 to node I 102 in which the nodes have 10GBASE-X sublayers 218 with misrouted lanes. At node II 104, the message is formatted as XGMII characters. The PCS 220 at node II 104 maps the XGMII characters to four lanes. The encoder 402 in each lane converts eight data bits and a control bit of each XGMII character to a ten-bit code group. However, in FIG. 7B, between the ports of the encoders 402 and the ports of the multiplexer 702, lanes 0 and 1 are misrouted. The multiplexer 702 at node II 104 formats the four lanes as a bit stream in which the lanes are transmitted in an improper sequence—lane 1, lane 0, lane 2, and lane 3—with the bits in each lane transmitted in the following order: abcdeifghj (see FIG. 4). The bit stream is communicated from node II 104 across physical medium 120 to node I 102. At node II 104, the data is formatted as the XGMII character, but the resulting XGMII character is in the improper sequence: lane 1, lane 0, lane 2, and lane 3, instead of lane 0, lane 1, lane 2, and lane 3.

Misrouting of 10GBASE-X 218 lanes can also occur between ports at other locations or may be the result of an improperly configured multiplexer 702 or demultiplexer 704. The possibility of lanes being misrouted diminishes the reliability of the IEEE Std 802.3ae protocol. The present invention recognizes the importance of verifying a 10GBASE-X 218 lane routing between nodes. The present invention also provides a method that would be capable of correcting the effects of misrouted lanes on communications between nodes. The present invention defines a special ordered set that: (1) complies with IEEE Std 802.3ae specifications for ordered sets and (2) is different from ordered sets predefined by IEEE Std 802.3ae. Preferably, the special ordered set has a different code group in each lane. When the special ordered set has a different code group in each lane, it can be used to verify the 10GBASE-X 218 lane routing between nodes and, if necessary, to correct the effects of misrouted lanes on communications between nodes.

For example, in FIG. 7A, if special ordered set /Da.b/Dc.d/De.f/Dg.h/ is transmitted from the PCS 220 of node I 102 and received at the PCS 220 of node II 104, then the present invention has verified the 10GBASE-X 218 lane routing between nodes I 102 and II 104. However, in FIG. 7B, if special ordered set /Da.b/Dc.d/De.f/Dg.h/ is transmitted from the PCS 220 of node I 102, but ordered set /Da.b/Dc.d/Dg.h/De.f/ is received at the PCS 220 of node II 104, then the present invention has identified misrouting of lanes between nodes I 102 and II 104. Furthermore, the received ordered set identifies lanes 2 and 3 as the misrouted lanes. In this situation, either the transmission of lanes 2 and 3 from node I 102 or the reception of lanes 2 and 3 at node II 104 can be reversed to correct for the effects of misrouted lanes on communications between nodes I 102 and II 104.

In FIG. 7B, the misrouted lanes are located in the PMA 222 of node II 104. It will be understood that the misrouted lanes are not limited to this location and could be located in the PCS 220, PMA 222, PMD 224, or any combination of the foregoing of node I 102 or node II 104. Alternatively, misrouting may be the result of an improperly configured multiplexer 702 or demultiplexer 704 in node I 102 or node II 104. It will also be understood that the present invention is not limited to the specific lane configurations presented in FIG. 7B.

In an embodiment, the present invention takes advantage of the processes that allow nodes to communicate with each other when their transceivers are in idle mode. The present invention extends this ability beyond the specific features provided for by IEEE Std 802.3ae by leveraging its protocol for transmitting Q-ordered sets. As explained above, in order to be compliant with IEEE Std 802.3ae, a network device that implements the PCS 220 can implement the requirements of IEEE Std 802.3ae in any manner it chooses, but should include a first Q-ordered filter to identify a Q-ordered set when it is transmitted from the RS 208 and a second Q-ordered filter to identify a Q-ordered set when it is received from the PMA sublayer 222. The network device is free to include other processes so long as these do not conflict with the standard. The network device that meets these criteria is said to be compliant with the standard. In this sense, a Q-ordered set need not be limited to the IEEE Std 802.3ae designation as having special code group K28.4 in lane 0 followed by three data code groups in lanes 1, 2, and 3: /K28.4/Dx.y/Dx.y/Dx.y/ (see FIG. 6). Rather, the designation of a Q-ordered set can be expanded to include any ordered set that a programmable Q-ordered filter can be configured to recognize, while remaining compliant with IEEE Std 802.3ae. A programmable Q-ordered filter can recognize any ordered set that is different from ordered sets predefined by IEEE Std 802.3ae. Preferably, the ordered set does not include any invalid code groups. For example, a Q-ordered filter can be programmed to recognize ordered set /D0.1/K27.7/D2.3/D4.5/.

In the present invention, the first and second Q-ordered filters can be programmed to identify both the standard-defined Q-ordered sets (e.g., ||LF|| and ||RF||) and special ordered sets. A special ordered set can be, for example, /Da.b/Dc.d/De.f/Dg.h/, where data code groups Da.b, Dc.d, De.f, and Dg.h indicate that any data code group can be used in any lane so long as no two lanes have the same data code group. Special ordered sets can also include one or more special code groups. However, when a special ordered set includes a special code group, preferably no permutation of the code groups in the special ordered set should yield an ordered set predefined by IEEE Std 802.3ae. For example, a permutation of ordered set /D0.1/K27.7/D2.3/D4.5/ is /K27.7/D0.1/D2.3/

D4.5/. In IEEE Std 802.3ae, special code group K27.7 in lane 0 indicates the start of transmission of a packet. Thus, it is possible that the use of ordered set /D0.1/K27.7/D2.3/D4.5/ as a special ordered set for verifying a 10GBASE-X 218 lane routing between nodes could be misinterpreted at the receiving node as the start of transmission of a packet.

A special ordered set can be generated and transmitted automatically when a node is activated or upon the recognition or the detection of a link status condition indicative of misrouted lanes. Special ordered sets can be preprogrammed within the network device (e.g., one time programmable), capable of being programmed by a user (e.g., reprogrammable), or both. Such programmable Q-ordered filters extend the ability of the network device to verify a 10GBASE-X 218 lane routing between nodes and, if necessary, to correct the effects of misrouted lanes on communications between nodes.

Figure 8:
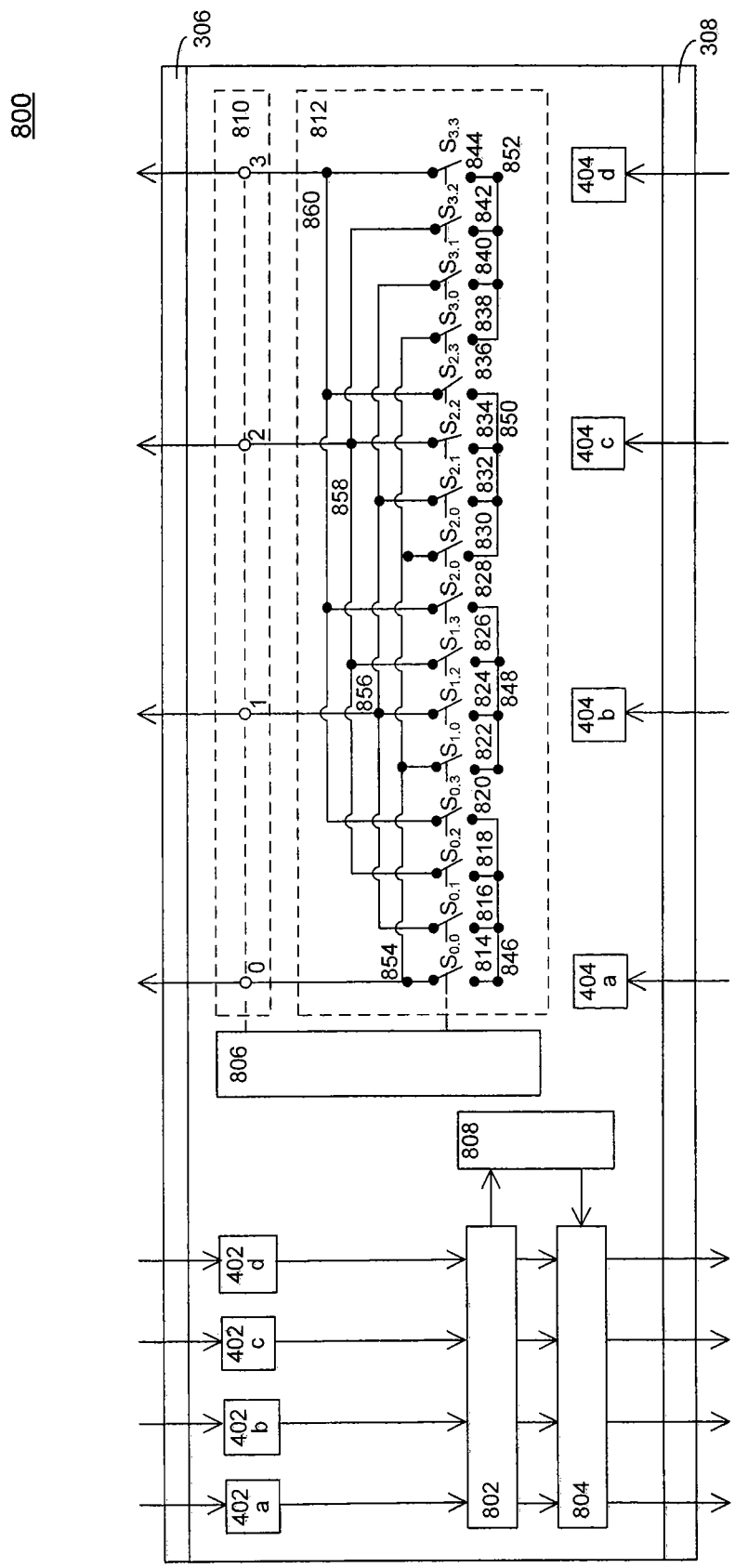
FIG. 8 is a block diagram of a network device 800 for implementing an IEEE Std 802.3ae PCS 220 in the manner of the present invention.

FIG. 8 is a block diagram of a network device 800 for implementing an IEEE Std 802.3ae PCS 220 in the manner of the present invention. Network device 800 comprises PCS service interface 306; PMA service interface 308; Encoders 402*a*, 402*b*, 402*c*, and 402*d*; Decoders 404*a*, 404*b*, 404*c*, and 404*d*; a first logic circuit 802; a second logic circuit 804; a third logic circuit 806; a first memory 808; and a second memory 810. Encoders 402*a*, 402*b*, 402*c*, and 402*d* are coupled to PCS service interface 306 and are configured to encode 36 bits of an XGMII character into four lanes of code groups. PMA service interface 308 is coupled to Encoders 402*a*, 402*b*, 402*c*, and 402*d*. Decoders 404*a*, 404*b*, 404*c*, and 404*d* are coupled between PCS service interface 306 and PMA service interface 308 and are configured to decode the four lanes of the code groups into an XGMII character. An identity of a special ordered set can be preprogrammed within at least one of first logic circuit 802 and third logic circuit 806. An identity of a special ordered set can be capable of being programmed by a user.

First logic circuit 802 (a first Q-ordered filter) is coupled between PCS service interface 306 and PMA service interface 308 and is configured to identify a transmitted special ordered set. The transmitted special ordered set complies with IEEE Std 802.3ae specifications for ordered sets. The transmitted special ordered set is different from ordered sets predefined by IEEE Std 802.3ae. Preferably, the transmitted special ordered set has a different code group in each lane. (First logic circuit 802 can also be configured to identify an ordered set from the ordered sets predefined by IEEE Std 802.3ae, such as a standard-defined Q-ordered set (e.g., ||LF|| or ||RF||).) First memory 808 is coupled to first logic circuit 802 and is configured to store the ordered set (e.g., the transmitted special ordered set or the standard-defined Q-ordered set). Second logic circuit 804 is coupled to first logic circuit 802 and is configured to ensure that the ordered set is transmitted in place of a K-ordered set or an R-ordered set during a clock cycle following a transmission of an A-ordered set.

Second memory 810 is coupled between PCS service interface 306 and PMA service interface 308 and is configured to store an ordered set received from the PMA sublayer 222 (e.g., a received special ordered set or a standard-defined Q-ordered set). Third logic circuit 806 (a second Q-ordered filter) is coupled to second memory 810 and is configured to identify the special ordered set received from the PMA sublayer 222. (Third logic circuit 806 can also be configured to identify an ordered set from the ordered sets predefined by IEEE Std 802.3ae, such as a standard-defined Q-ordered set (e.g., ||LF|| or ||RF||).) In this manner, third logic circuit 806 can verify a 10GBASE-X 218 lane routing between a transmitting node and the node incorporating network device 800. For example, if the transmitted special ordered set is /Da.b/Dc.d/De.f/Dg.h/ and it is received at second memory 810 and identified by third logic circuit 806, then network device 800 has verified the 10GBASE-X 218 lane routing between the transmitting node and the node incorporating network device 800.

In an embodiment, a fourth logic circuit 812 can be coupled to third logic circuit 806 and configured to correct the effects of misrouted lanes on communications between nodes. Fourth logic circuit 812 can comprise a set of switches such that each switch is configured to route a lane from an input port to an output port. For example, fourth logic circuit 812 can include four switches associated with lane 0: $S_{0,0}$ 814, $S_{0,1}$ 816, $S_{0,2}$ 818, and $S_{0,3}$ 820; four switches associated with lane 1: $S_{1,0}$ 822, $S_{1,1}$ 824, $S_{1,2}$ 826, and $S_{1,3}$ 828; four switches associated with lane 2: $S_{2,0}$ 830, $S_{2,1}$ 832, $S_{2,2}$ 834, and $S_{2,3}$ 836; and four switches associated with lane 3: $S_{3,0}$ 838, $S_{3,1}$ 840, $S_{3,2}$ 842, and $S_{3,3}$ 844. A first input port 846 is coupled to switches $S_{0,0}$ 814, $S_{0,1}$ 816, $S_{0,2}$ 818, and $S_{0,3}$ 820. A second input port 848 is coupled to switches $S_{1,0}$ 822, $S_{1,1}$ 824, $S_{1,2}$ 826, and $S_{1,3}$ 828. A third input port 850 is coupled to switches $S_{2,0}$ 830, $S_{2,1}$ 832, $S_{2,2}$ 834, and $S_{2,3}$ 836. A fourth input port 852 is coupled to switches $S_{3,0}$ 838, $S_{3,1}$ 840, $S_{3,2}$ 842, and $S_{3,3}$ 844. A first output port 854 is coupled to switches $S_{0,0}$ 814, $S_{1,0}$ 822, $S_{2,0}$ 830, and $S_{3,0}$ 838. A second output port 856 is coupled to switches $S_{0,1}$ 816, $S_{1,1}$ 824, $S_{2,1}$ 832, and $S_{3,1}$ 840. A third output port 858 is coupled to switches $S_{0,2}$ 818, $S_{1,2}$ 826, $S_{2,2}$ 834, and $S_{3,2}$ 842. A fourth output port 860 is coupled to switches $S_{0,3}$ 820, $S_{1,3}$ 828, $S_{2,3}$ 836, and $S_{3,3}$ 844.

When the lanes are properly routed, switches $S_{0,0}$ 814, $S_{1,1}$ 824, $S_{2,2}$ 834, and $S_{3,3}$ 844 are closed and the others are opened. Initially, network device 800 can assume that the lanes are properly routed. For example, if the transmitted special ordered set is /Da.b/Dc.d/De.f/Dg.h/, but the special ordered set received at second memory 810 is /Da.b/Dc.d/Dg.h/De.f/, then third logic circuit 806 can identify that lanes 2 and 3 are misrouted. In this case, fourth logic circuit 812 can cause switches $S_{2,2}$ 834 and $S_{3,3}$ 844 to open and switches $S_{2,3}$ 836 and $S_{3,2}$ 842 to close to correct the effects of the misrouted lanes on the communication of data between the nodes. FIG. 9 presents a table of Lane Correction Switch Configuration as a function of the Received Special Ordered Set. The table assumes that the transmitted special ordered set is /Da.b/Dc.d/De.f/Dg.h/. As a function of the special ordered set received at second memory 810, the table indicates which switches of fourth logic circuit 812 should be closed to correct the effects of the misrouted lanes. For a given received special ordered set, those switches of fourth logic circuit 812 that are not indicated should be opened.

Recall that IEEE Std 802.3ae uses Idle ordered sets: (1) to verify that code group reception of each lane is synchronized, (2) to check alignment of each lane relative to the others, and (3) to provide for clock rate compensation (10GBASE-X 218 supports multiple clock domains along a link segment). For these purposes, IEEE Std 802.3ae defines three specific Idle ordered sets: ||K||, ||A||, and ||R|| (see FIG. 6). Respectively, these are also referred to as a K-ordered set, an A-ordered set, and an R-ordered set. The standard also provides a protocol for determining when each of these Idle ordered sets is transmitted. Generally summarized, a random integer "r" is periodically generated. By the standard, r can range from 16 to 31. If r is odd, then an R-ordered set is transmitted each clock cycle, except that an A-ordered set is transmitted every $r^{th}$ cycle. If r is even, then a K-ordered set is transmitted each clock cycle, except that an A-ordered set is transmitted every $r^{th}$ cycle.

IEEE Std 802.3ae uses Sequence ordered sets to communicate certain link status conditions. A Sequence ordered set is annotated as ||Q|| and thus is also referred to as a Q-ordered set. The standard provides that, when a local or remote fault is recognized or detected by the PCS 220 or RS 208, the appropriate Q-ordered set (e.g., ||LF|| or ||RF||) is to be generated. If generated by the RS 208, the Q-ordered set is transmitted to the PCS 220, where the Q-ordered set is received. A Q-ordered set received or generated by the PCS 220 is transmitted in place of the K-ordered set or the R-ordered set during the clock cycle immediately following the transmission of the A-ordered set. The Q-ordered set can be stored until the next A-ordered set is transmitted.

Advantageously, implementing the present invention so that special ordered sets are communicated in the same manner as Q-ordered sets leverages the functions performed by the Idle ordered sets. In such an implementation, verifying a lane routing between nodes and correcting the effects of misrouted lanes on communications between nodes becomes, in a sense, part of the link status testing performed when transceivers of the nodes are in idle mode. Transmission of a K-ordered set verifies that code group reception of each lane is synchronized. A K-ordered set is /K28.5/K28.5/K28.5/K28.5/ (see FIG. 6). Because a K-ordered set includes the same code group in each lane, misrouted lanes do not effect the ability of a K-ordered set to perform its functions. Transmission of an R-ordered set provides for clock rate compensation. An R-ordered set is /K28.0/K28.0/K28.0/K28.0/ (see FIG. 6). Because an R-ordered set includes the same code group in each lane, misrouted lanes do not effect the ability of an R-ordered set to perform its functions. Transmission of an A-ordered set checks alignment of each lane relative to the others. An A-ordered set is /K28.3/K28.3/K28.3/K28.3/ (see FIG. 6). Because an A-ordered set includes the same code group in each lane, misrouted lanes do not effect the ability of an A-ordered set to perform its functions.

Additionally, because of the IEEE Std 802.3ae protocol for transmitting Idle and Sequence ordered sets, transmission of a K-ordered set or an R-ordered set also verifies connectivity between nodes, while transmission of an A-ordered set is also indicative that a Q-ordered set may be transmitted during the clock cycle immediately following the transmission of the A-ordered set. In this manner, implementing the present invention so that special ordered sets are communicated in the same manner as Q-ordered sets acts to ensure that actions that verify a 10GBASE-X 218 lane routing between nodes and that correct the effects of misrouted lanes on communications between nodes occur after the performance of preliminary measures. The preliminary measures: (1) verify connectivity between nodes, (2) verify that code group reception of each lane is synchronized, (3) provide for clock rate compensation, and (4) check alignment of each lane relative to the others. Sequencing transmission of a special ordered set to follow the Idle ordered sets in this manner can prevent the initiation of actions to correct for the effects of lanes that might appear to be misrouted, but in actuality are subject to another link status condition that warrants a different corrective measure.

In another embodiment, the second Q-ordered filter can be programmed to identify certain variations (i.e., /D1.0/K28.4/D0.0/D0.0/, /D0.0/D1.0/K28.4/D0.0/, /D0.0/D0.0/D1.0/K28.4/, /D1.0/D0.0/D0.0/K28.4/, /K28.4/D1.0/D0.0/D0.0/, /D0.0/K28.4/D1.0/D0.0/, /D0.0/D0.0/K28.4/D1.0/, /D2.0/K28.4/D0.0/D0.0/, /D0.0/D2.0/K28.4/D0.0/, /D0.0/D0.0/D2.0/K28.4/, /D2.0/D0.0/D0.0/K28.4/, /K28.4/D2.0/D0.0/D0.0/, /D0.0/K28.4/D2.0/D0.0/, and /D0.0/D0.0/K28.4/D2.0/) of the standard-defined Q-ordered sets (e.g., ||LF|| and ||RF||). These variations of the standard-defined Q-ordered sets can be indicative of misrouted lanes. If the misrouted lanes have merely been rotated, reversed, or reversed and rotated, then identification of one of these variations can further identify the manner in which the lanes have been rotated, reversed, or reversed and rotated. For example, if LF-ordered set /K28.4/D0.0/D0.0/D1.0/is transmitted, but ordered set /D1.0/K28.4/D0.0/D0.0/is received, then the present invention has identified that transmitted lane 0 has been misrouted (rotated) to received lane 1, transmitted lane 1 has been misrouted (rotated) to received lane 2, transmitted lane 2 has been misrouted (rotated) to received lane 3, and transmitted lane 3 has been misrouted (rotated) to received lane 0. In this situation, either the transmitted lanes or the received lanes can be rerouted to correct for the effects of the misrouted lanes. Advantageously, implementing the present invention so that the second Q-ordered filter is programmed to identify certain variations of the standard-defined Q-ordered sets can preclude the need to define special ordered sets.

In yet another embodiment, the standard-defined Q-ordered sets (e.g., ||LF|| and ||RF||) or special ordered sets of the present invention can be transmitted from a transmitting node as part of a packet when the transceiver of the transmitting node is in data mode. Other code groups transmitted with the packet could serve to communicate to the receiving node that the routing of 10GBASE-X 218 lanes between the nodes is being verified and, if necessary, the effects of misrouted lanes on communications between the nodes is being corrected. Furthermore, in any embodiment of the present invention, the standard-defined Q-ordered sets (e.g., ||LF|| and ||RF||) or special ordered sets of the present invention (and other associated code groups, when needed) can be generated and transmitted automatically when a node is activated, or upon the recognition or the detection of a link status condition indicative of misrouted lanes.

Figure 10A:
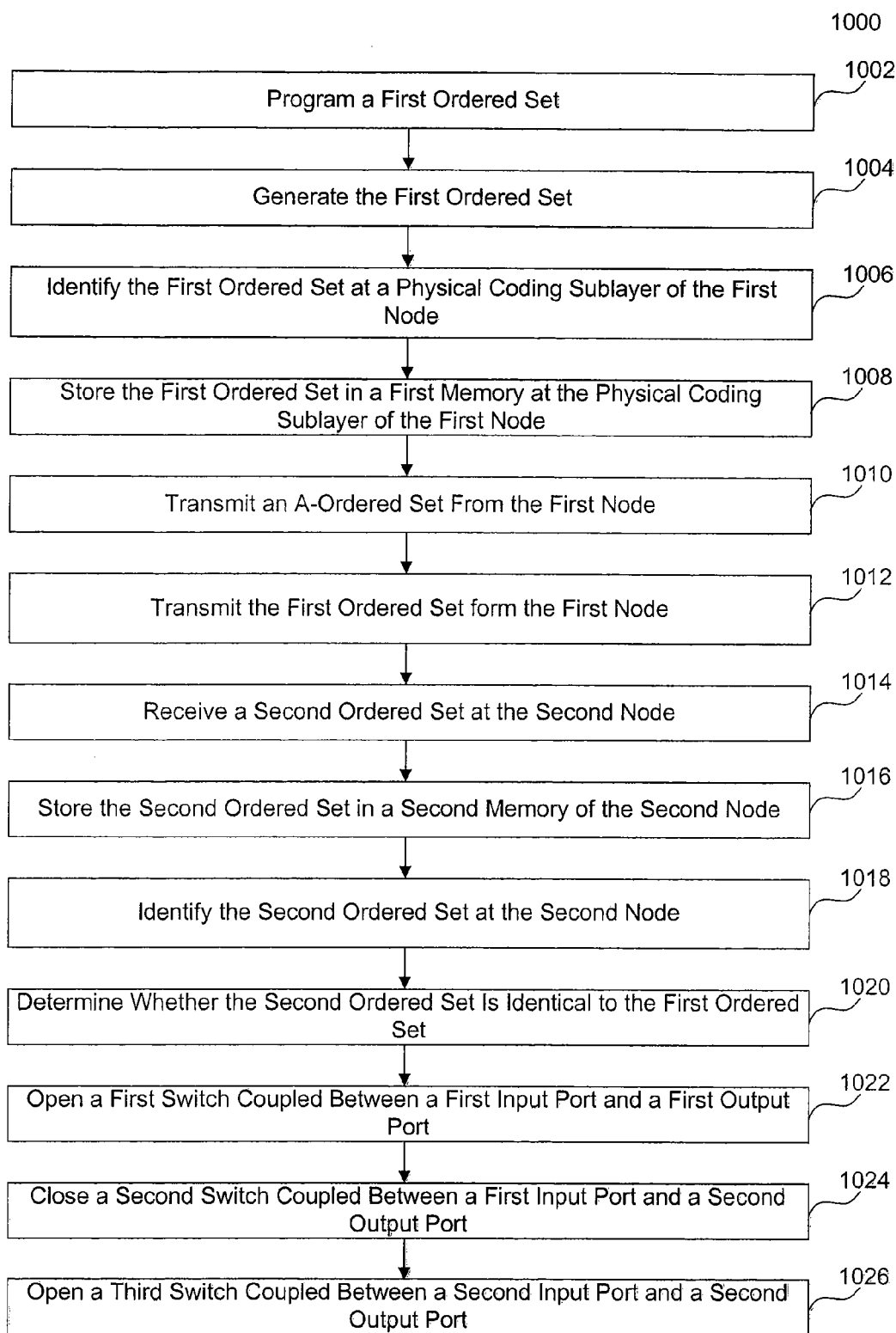
FIGS. 10A and 10B show a flow chart of a method 1000 for verifying, in the manner of the present invention, a 10GBASE-X 218 lane routing between a first node with an IEEE Std 802.3ae 10GBASE-X Physical Layer 218 and a second node with an IEEE Std 802.3ae 10GBASE-X Physical Layer 218.
Figure 10B:
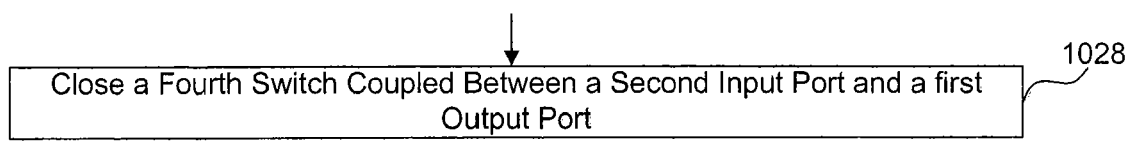

FIGS. 10A and 10B show a flow chart of a method 1000 for verifying, in the manner of the present invention, a 10GBASE-X 218 lane routing between a first node with an IEEE Std 802.3ae 10GBASE-X Physical Layer 218 and a second node with an IEEE Std 802.3ae 10GBASE-X Physical Layer 218. In method 1000, at an optional step 1002, a user programs a first ordered set. Alternatively, the first ordered set can be preprogrammed within a PCS of the first node. The first ordered set complies with IEEE Std 802.3ae specifications for ordered sets. The first ordered set is different from ordered sets predefined by IEEE Std 802.3ae. Preferably, the first ordered set has a different code group in each lane. Permutations of the code groups within the first ordered set yield different ordered sets. Preferably, each of the different ordered sets is different from the ordered sets predefined by IEEE Std 802.3ae.

At a step 1004, the first ordered set is generated. For example, the first ordered set can be generated when the first node is activated, upon recognizing or detecting a link status condition indicative of misrouted IEEE Std 802.3ae 10GBASE-X lanes, or both. If the first ordered set is to be transmitted when the transceiver of the first node is in idle mode, then method 1000 proceeds to a step 1006. Otherwise, method 1000 proceeds to a step 1012. At step 1006, the first ordered set is identified at the PCS of the first node. For example, a logic circuit can be used to identify the first ordered set. If the first ordered set cannot be transmitted immediately, then it is, at a step 1008, stored in a first memory at the PCS of the first node. At a step 1010, an A-ordered set is transmitted from the first node. At step 1012, the first ordered set is transmitted from the first node.

At a step 1014, a second ordered set is received at the second node. Optionally, at a step 1016, the second ordered set is stored in a second memory of the second node. At a step 1018, the second ordered set is identified at the second node. For example, another logic circuit can be used to identify the second ordered set. At a step 1020, a determination is made whether the second ordered set is identical to the first ordered set.

Optionally, the effects of misrouted IEEE Std 802.3ae 10GBASE-X lanes can be corrected in response to the identified second ordered set. In an embodiment, the effects of misrouted IEEE Std 802.3ae 10GBASE-X lanes can be corrected, at a step 1022, by opening a first switch coupled between a first input port and a first output port and, at a step 1024, by closing a second switch coupled between the first input port and a second output port. For example, in FIG. 8, if lane 2 has been misrouted to lane 3, switch $S_{3,3}$ 844, coupled between input port 852 and output port 860 is opened and switch $S_{3,2}$ 842, coupled between input port 852 and output port 858 is closed. The effects of misrouted IEEE Std 802.3ae 10GBASE-X lanes can be further corrected, at a step 1026, by opening a third switch coupled between the second input port and the second output port and, at a step 1028, by closing a fourth switch coupled between the second input port and the first output port. For example, in FIG. 8, if lane 3 has been misrouted to lane 2, switch $S_{2,2}$ 834, coupled between input port 850 and output port 858 is opened and switch $S_{2,3}$ 836, coupled between input port 850 and output port 860 is closed.

Figure 11:
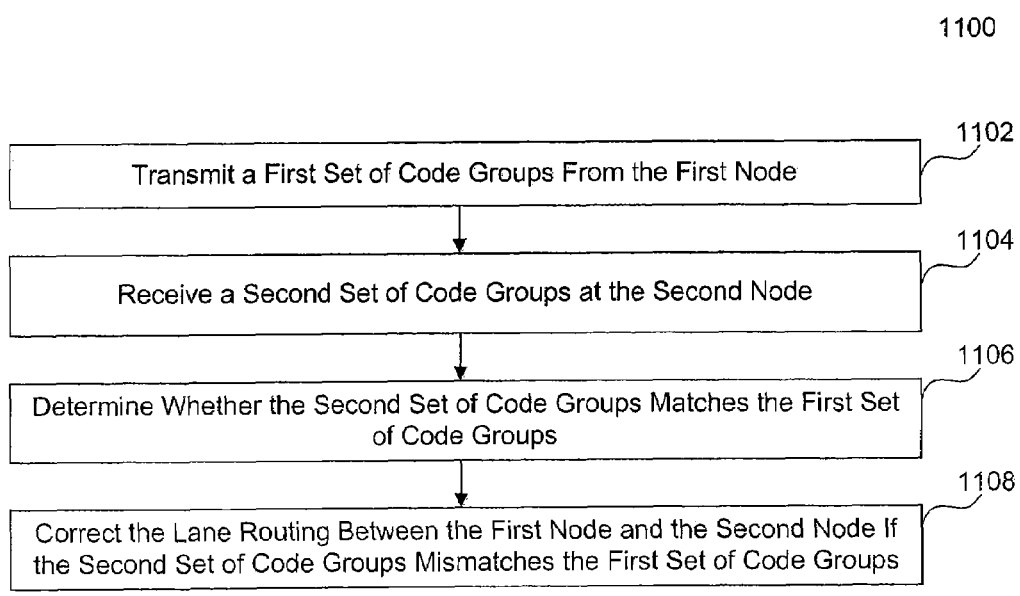
FIG. 11 shows a flow chart of a method 1100 of verifying a lane routing between a first node in a network and a second node in the network.

FIG. 11 shows a flow chart of a method 1100 of verifying a lane routing between a first node in a network and a second node in the network. The first node and the second node operate according to a protocol in which: (1) a character is converted to code groups, (2) each code group has a corresponding lane, and (3) the code groups are communicated across the lanes in a parallel manner. In method 1100, at a step 1102, a first set of code groups is transmitted from the first node. The first set of code groups has a different code group in each lane. Preferably, the first set of code groups is different from a set of code groups predefined by the protocol. At a step 1104, a second set of code groups is received at the second node. The second set of code groups corresponds to the first set of code groups. At a step 1106, a determination is made whether the second set of code groups matches the first set of code groups. An identity of the first set of code groups can be preprogrammed within the second node. Preferably, the first set of code groups has a different code group in each lane. At an optional step 1108, the lane routing between the first node and the second node is corrected if the second set of code groups mismatches the first set of code groups.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. In a local area network having a first hardware node with an IEEE Std 802.3ae™ 10GBASE-X Physical Layer and a second hardware node with the IEEE Std 802.3ae 10GBASE-X Physical Layer, a method for verifying a 10GBASE-X lane routing between the first hardware node and the second hardware node, comprising the steps of:

(1) transmitting a first ordered set from the first hardware node;

(2) receiving a second ordered set at the second hardware node, the second ordered set corresponding to the first ordered set; and (3) determining if the second ordered set is identical to the first ordered set;

wherein:

the first ordered set complies with IEEE Std 802.3ae specifications for ordered sets; and the first ordered set is different from ordered sets predefined by the IEEE Std 802.3ae specifications.

2. The method of claim 1, wherein permutations of code groups within the first ordered set yield different ordered sets, each of the different ordered sets is different from the ordered sets predefined by the IEEE Std 802.3ae specifications.

3. The method of claim 1, wherein the first ordered set has a different code group in each lane.

4. The method of claim 1, wherein the first ordered set is preprogrammed within a Physical Coding Sublayer.

5. The method of claim 1, wherein the first ordered set is capable of being programmed by a user.

6. The method of claim 1, further comprising the step of:
generating the first ordered set.

7. The method of claim 6, wherein the first ordered set is generated when the first hardware node is activated.

8. The method of claim 6, wherein the first ordered set is generated upon recognizing a link status condition indicative of misrouted IEEE Std 802.3ae 10GBASE-X lanes.

9. The method of claim 6, wherein the first ordered set is generated upon detecting a link status condition indicative of misrouted IEEE Std 802.3ae 10GBASE-X lanes.

10. The method of claim 1, further comprising the step of:
storing the first ordered set in a memory at a Physical Coding Sublayer of the first hardware node.

11. The method of claim 1, further comprising the step of:
identifying the first ordered set.

12. The method of claim 1, wherein the first ordered set is transmitted after an A-ordered set.

13. The method of claim 1, further comprising the step of:
storing the second ordered set in a memory of the second hardware node.

14. The method of claim 1, further comprising the step of:
identifying the second ordered set at the second hardware node.

15. The method of claim 14, further comprising the step of:
correcting effects of misrouted IEEE Std 802.3ae 10GBASE-X lanes in response to said identified second ordered set.

16. The method of claim 15, wherein said correcting comprises the steps of:

(a) opening a first switch coupled between a first input port and a first output port; and (b) closing a second switch coupled between the first input port and a second output port.

17. The method of claim 16, further comprising the steps of:

(c) opening a third switch coupled between the second input port and the second output port; and (d) closing a fourth switch coupled between the second input port and the first output port.

18. A network device for implementing an IEEE Std 802.3ae™ Physical Coding Sublayer, comprising:
- a Physical Coding Sublayer service interface;
- Encoders coupled to said Physical Coding Sublayer service interface and configured to encode a 10 Gigabit Media Independent Interface character into code groups;
- a Physical Medium Attachment service interface coupled to said Encoders;
- Decoders coupled between said Physical Coding Sublayer service interface and said Physical Medium Attachment service interface and configured to decode said code groups into said 10 Gigabit Media Independent Interface character;
- a first logic circuit coupled between said Physical Coding Sublayer service interface and said Physical Medium Attachment service interface and configured to identify a first ordered set received from a Reconciliation Sublayer;
- a first memory coupled to said first logic circuit and configured to store said first ordered set;
- a second logic circuit coupled to said first logic circuit and configured to ensure that said first ordered set is transmitted in place of one of a K-ordered set and an R-ordered set during a clock cycle following a transmission of an A-ordered set;
- a second memory coupled between said Physical Coding Sublayer service interface and said Physical Medium Attachment service interface and configured to store a second ordered set received from a Physical Medium Attachment sublayer; and
- a third logic circuit coupled to said second logic circuit and configured to identify said second ordered set received from said Physical Medium Attachment sublayer;
- wherein:
  - said first ordered set complies with IEEE Std 802.3ae specifications for ordered sets; and
  - said first ordered set is different from ordered sets predefined by said IEEE Std 802.3ae specifications.

19. The network device of claim 18, wherein said second ordered set is identical to said first ordered set.

20. The network device of claim 18, wherein permutations of code groups within said first ordered set yield different ordered sets, each of said different ordered sets being different from said ordered sets predefined by said IEEE Std 802.3ae specifications.

21. The network device of claim 18, wherein said first ordered set has a different code group in each lane.

22. The network device of claim 18, wherein an identity of said first ordered set is preprogrammed within said first logic circuit.

23. The network device of claim 18, wherein an identity of said first ordered set is capable of being programmed by a user.

24. The network device of claim 18, wherein an identity of said second ordered set is preprogrammed within said third logic circuit.

25. The network device of claim 18, wherein at least one of said first logic circuit and said third logic circuit is further configured to identify an ordered set from said ordered sets predefined by said IEEE Std 802.3ae specifications.

26. The network device of claim 18, further comprising a fourth logic circuit coupled to said third logic circuit and configured to correct effects of misrouted IEEE Std 802.3ae 10GBASE-X lanes.

27. The network device of claim 26, wherein said fourth logic circuit corrects said effects of said misrouted IEEE Std 802.3ae 10GBASE-X lanes in response to said second ordered set stored in said second memory.

28. The network device of claim 27, wherein said fourth logic circuit comprises a set of switches, each switch in said set of switches configured to route an IEEE Std 802.3ae 10GBASE-X lane of said misrouted IEEE Std 802.3ae 10GBASE-X lanes from an input port to an output port.

29. The network device of claim 28, wherein said set of switches comprises sixteen switches.

30. In a network having a first node that operates according to a protocol in which a character is converted to code groups, each code group of the code groups having a corresponding lane, the code groups communicated across the lanes in a parallel manner, and a second node that operates according to the protocol, a method of verifying a lane routing between the first node and the second node, comprising the steps of:
 (1) transmitting a first set of code groups from the first node, wherein each code group of the first set of code groups is different from special code groups predefined by the protocol;
 (2) receiving a second set of code groups at the second node, the second set of code groups corresponding to the first set of code groups; and
 (3) determining if the second set of code groups matches the first set of code groups.

31. The method of claim 30, wherein the first set of code groups is different from a set of code groups predefined by the protocol.

32. The method of claim 30, wherein the first set of code groups has a different code group in each lane.

33. The method of claim 32, further comprising the step of:
 correcting the lane routing between the first hardware node and the second hardware node if the second set of code groups mismatches the first set of code groups.

34. The method of claim 30, wherein an identity of the first set of code groups is preprogrammed within the second hardware node.

35. In a local area network having a first hardware node with an IEEE Std 802.3ae™ 10GBASE-X Physical Layer and a second hardware node with the IEEE Std 802.3ae 10GBASE-X Physical Layer, a method for verifying a 10GBASE-X lane routing between the first hardware node and the second hardware node, comprising the steps of:
 (1) transmitting a Q-ordered set from the first hardware node;
 (2) receiving a second ordered set at the second hardware node, the second ordered set corresponding to the Q-ordered set; and
 (3) determining if the second ordered set is identical to the Q-ordered set;
 wherein:
  the Q-ordered set is one of /K28.4/D0.0/D0.0/D1.0/ and /K28.4/D0.0/D0.0/D2.0/; and
  the second ordered set is one of /K28.4/D0.0/D0.0/D1.0/, /D1.0/K28.4/D1.0/D0.0/, /D0.0/D1.0/K28.4/D0.0/, /D0.0/D0.0/D1.0/K28.4/, /D1.0/D0.0/D0.0/K28.4/, /K28.4/D1.0/D0.0/D0.0/, /D0.0/K28.4/D1.0/D0.0/, /D0.0/D0.0/K28.4/D1.0/, /K28.4/D0.0/D0.0/D2.0/, /D2.0/K28.4/D0.0/D0.0/, /D0.0/D2.0/K28.4/D0.0/, /D0.0/D0.0/D2.0/K28.4/, /D2.0/D0.0/D0.0/K28.4/, /K28.4/D2.0/D0.0/D0.0/, /D0.0/K28.4/D2.0/D0.0/, and /D0.0/D0.0/K28.4/D2.0/.

* * * * *

UNITED STATES PATENT AND TRADEMARK OFFICE
CERTIFICATE OF CORRECTION

PATENT NO. : 7,668,086 B2  Page 1 of 1
APPLICATION NO. : 10/667385
DATED : February 23, 2010
INVENTOR(S) : Caldwell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1888 days.

Signed and Sealed this

Seventh Day of December, 2010

David J. Kappos
*Director of the United States Patent and Trademark Office*